No. 694,732. Patented Mar. 4, 1902.
J. COUDON.
DECOY.
(Application filed Dec. 17, 1901.)

(No Model.)

Witnesses
H. F. Meyer Jr.
F. S. Stitt

Inventor
Joseph Coudon
By Chas. B. Mann
Attorney

UNITED STATES PATENT OFFICE.

JOSEPH COUDON, OF AIKEN, MARYLAND.

DECOY.

SPECIFICATION forming part of Letters Patent No. 694,732, dated March 4, 1902.

Application filed December 17, 1901. Serial No. 86,272. (No model.)

*To all whom it may concern:*

Be it known that I, JOSEPH COUDON, a citizen of the United States, residing at Aiken, in the county of Cecil and State of Maryland, have invented certain new and useful Improvements in Decoys, of which the following is a specification.

This invention is an improvement in floating devices for decoying ducks or the like; and its object is to provide an improved device of this character which is capable of being readily folded up into a comparatively small space for packing or transportation and which may be spread out to hold several decoys floating in the water in life-like position with respect to each other.

The invention consists in certain constructions, arrangements, and combinations of the parts hereinafter fully described and claimed, reference being had to the accompanying drawings, in which—

Figure 1:
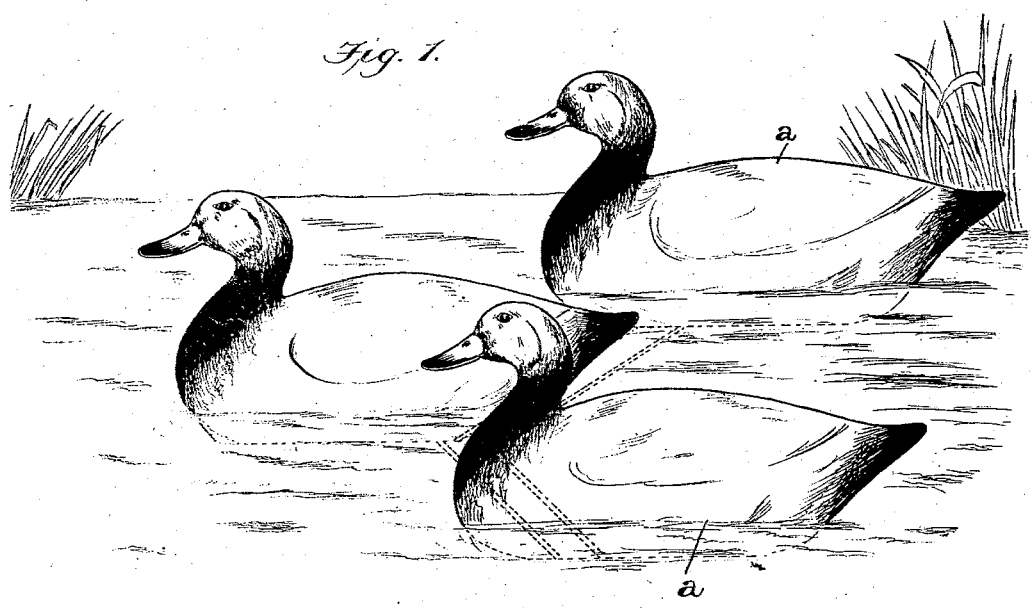
Figure 2:
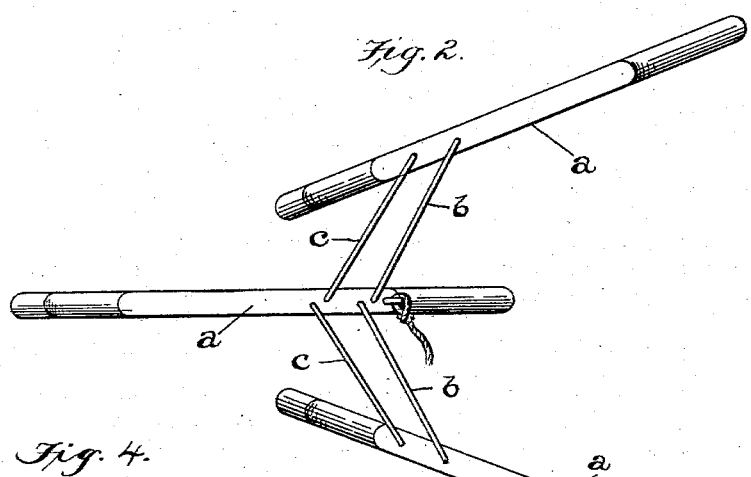
Figure 4:
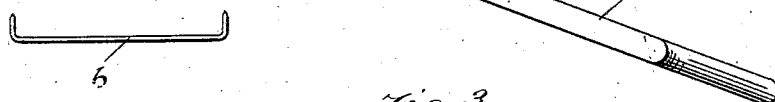
Figure 3:
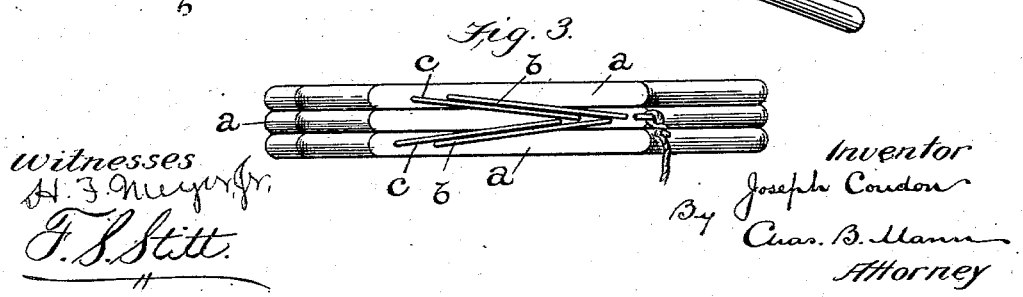

Figure 1 is a perspective view of the decoy device with the decoys spread out as they appear in practical use. Fig. 2 is an inverted plan view of the device with the decoys spread out. Fig. 3 is a similar view with the several decoys folded against each other for convenience in packing and transportation. Fig. 4 is a detail view of one of the links employed to connect the several decoys.

Referring to the drawings, the letter *a* designates a decoy, of which there are three shown in the present instance, each composed of a comparatively narrow strip of wood or other suitable material shaped and painted to represent a duck in side view.

The three decoys *a* shown are adjustably and foldably connected together at their lower edges by means of links *b c*, each of which is provided with two laterally-extending ends, as shown in Fig. 4, which penetrate the lower edges of every two adjoining decoys, and thus pivotally hold the links to the decoys with friction sufficient to prevent accidental movement of one decoy-duck with respect to another. Each decoy *a* is connected to the one next adjoining by two of these links, whose ends are secured in the lower edge of the decoys and are spaced apart in the direction of the length of the latter, as indicated in Figs. 2 and 3, whereby the several decoys may be spread out more or less or folded against each other, as illustrated in Fig. 3, for convenience in packing or transportation. The forward link *c* is slightly shorter than the rear link *b*, and those ends of each pair of links that are secured to the middle decoy are farther apart than the other ends. By this construction when the decoys are spread for use the bodies of the two outside decoys take an oblique position with respect to the middle decoy, as shown in Fig. 2. This relative position is advantageous, because the decoys in whatever position they may assume in the water will present a side view of one or more of the decoys to the eye of the sportsman. This construction does not hinder the decoys from taking the closely-folded position, (seen in Fig. 3,) because the links will yield sufficiently on a little pressure being applied to permit this.

The decoys are of course intended to float with their bodies in vertical position on their comparatively narrow lower edges, as indicated in Fig. 1, and it is to be especially noted in this connection that one decoy forms a support or outrigger for the other, and all are thus prevented from toppling over on their sides. Hence in some of the appended claims I have used the term "support" to cover equivalents of one or more of the decoys illustrated, as I believe the scope of the invention warrants such use.

While the accompanying drawings illustrate the improved decoy device comprising three decoys adjustably and foldably connected together, as before described, yet it is manifest that two or a greater number than three may be so connected.

Having thus described my invention, what I claim as new, and desire to secure by Letters Patent, is—

1. A decoy device, comprising a support; a decoy; and two links each of which has one end pivotally connected to the support and the other end pivotally connected to the decoy, whereby the decoy may be swung away from, and also be folded up against the support, substantially as set forth.

2. A floatable decoy device, comprising a plurality of decoys; and two links pivotally connected at their ends to adjoining decoys and said ends spaced apart in the direction of the length of the decoys, substantially as set forth.

3. A floating decoy device, comprising three decoys shaped to represent ducks or the like; and pairs of links pivotally connected at their ends to the lower edges of adjoining decoys with said ends spaced apart in the direction of the length of the decoys—the two links of each pair being of unequal length, whereby when the decoys are spread apart the bodies of the two outside decoys will take an oblique position with respect to the middle decoy, as and for the purpose set forth.

In testimony whereof I affix my signature in the presence of two witnesses.

JOSEPH COUDON.

Witnesses:
   CHARLES B. MANN, Jr.,
   FREDERICK S. STITT.